United States Patent [19]

Moriyama et al.

[11] Patent Number: 4,528,601
[45] Date of Patent: Jul. 9, 1985

[54] DIGITAL SIGNAL REPRODUCING APPARATUS

[75] Inventors: Masaru Moriyama, Yamato; Kohei Sasamura, Sagamihara, both of Japan

[73] Assignee: Victor Company of Japan, Ltd., Kanagawa, Japan

[21] Appl. No.: 561,749

[22] Filed: Dec. 15, 1983

[30] Foreign Application Priority Data

Dec. 24, 1982 [JP] Japan .............................. 57-230320

[51] Int. Cl.³ .................... G11B 5/02; G11B 5/09; G11B 5/45
[52] U.S. Cl. ...................................... 360/46; 360/51; 360/67; 360/55
[58] Field of Search ............... 360/51, 55, 46, 39, 360/67; 375/11

[56] References Cited

U.S. PATENT DOCUMENTS 4,399,474 8/1983 Coleman, Jr. ...................... 360/46

FOREIGN PATENT DOCUMENTS

1417735 2/1973 United Kingdom .
2103905A 7/1982 United Kingdom .
2104756A 8/1982 United Kingdom .

Primary Examiner—Raymond F. Cardillo, Jr.
Assistant Examiner—Alyssa H. Bowler
Attorney, Agent, or Firm—Ladas & Parry

[57] ABSTRACT

A digital signal reproducing apparatus comprises a reproducing circuit for reproducing a recorded unipolar signal from a recording medium, an equalizer for subjecting the reproduced signal to a waveform equalization, a circuit for extracting a timing component having a period which is equal to one bit transmission period of the recorded unipolar signal from an output signal of the equalizer, a circuit for generating one or a plurality of clock signals which are in phase synchronism with the timing component and for forming one or a plurality of control signals by frequency-dividing the timing component by ½, a circuit for sampling and holding a peak value of the output signal of the equalizer for every one bit transmission period, a variable resistor for voltage-dividing the sampled and held signal to obtain a reference signal, a delay circuit for delaying the output signal of the equalizer, a comparing circuit for comparing the levels of the output signal of the delay circuit and the reference signal, and a circuit for producing a reproduced unipolar digital signal by controlling the pulse width and the pulse position of the output pulse signal of the comparing circuit by the one or a plurality of clock signals.

6 Claims, 22 Drawing Figures

DIGITAL SIGNAL REPRODUCING APPARATUS

BACKGROUND OF THE INVENTION

The present invention generally relates to reproducing apparatuses for reproducing a pre-recorded unipolar signal, that is, a digital signal, from a recording medium such as a magnetic tape, and more particularly to a digital signal reproducing apparatus which is capable of carrying out accurate data discrimination upon reproduction by not only discriminating an amplitude information but also discriminating a bit period information on the time base.

As a known system for transmitting a digital signal, there is the partial response system. According to this partial response system, the transmission characteristic of the transmission path is taken into consideration, and a level detection is carried out with respect to a coded signal which has a code format (digital format) different from the code format of the transmitted coded signal and is received in a satisfactory state. The code format of the received coded signal is restored back into the original code format of the transmitted coded signal.

On the other hand, when carrying out a magnetic recording and reproduction, there is a large deterioration in the response in the high frequency range during the recording and reproduction. In addition, because the reproducing system has a differential characteristic due to the winding of the magnetic head, there is a large attenuation in the low frequency components which are closer to D.C. components. Accordingly, there was a conventional magnetic recording and reproducing apparatus which employed the partial response system for the magnetic recording and reproduction of the digital signal. This conventional magnetic recording and reproducing apparatus recorded a digital signal having a code format which is matched with the magnetic recording and reproducing characteristics. Further, during the reproduction, the digital signals were reproduced by discriminating the level of the reproduced signal waveform, independent of the level fluctuations in the reproduced signal which were mainly caused by an unevenly coated magnetic layer, surface irregularities on the magnetic layer, and instability of the tape travel which are peculiar to the magnetic reproduction, and also independent of notable decrease in the level of the reproduced signal which is caused by signal dropouts due to dust particles and the like which are adhered on the magnetic surface.

According to the above conventional magnetic recording and reproducing apparatus, an analog audio signal which is to be recorded, for example, is subjected to a pulse code modulation (PCM) and modulated into a unipolar digital signal. The unipolar digital signal is passed through a converter and is then supplied to a 1-bit delay element (or a 2-bit delay element) wherein the unipolar digital signal is delayed by one bit transmission period. The delayed unipolar digital signal is fed back to the converter wherein the delayed unipolar digital signal is subjected to a modulo-2 addition (exclusive-OR operation) with a subsequent 1-bit input digital data, and is converted into a unipolar digital signal which is to be recorded. This unipolar digital signal which is obtained from the converter, is amplified in a recording amplifier, and is then recorded onto a magnetic tape by a recording magnetic head.

Next, in the reproducing system, the recorded unipolar digital signal is reproduced from the magnetic tape by a reproducing magnetic head. The reproduced signal has a pulse waveform which assumes a positive polarity when the recording current undergoes a transition from negative to positive polarity and assumes a negative polarity when the recording current undergoes a transition from positive to negative polarity, due to the differential characteristic of the reproducing system which is based on the characteristic of the winding of the reproducing magnetic head. The reproduced signal is amplified in a reproducing amplifier, and is then supplied to an equalizer. The equalizer compensates for the high frequency components which are attenuated during the process of the magnetic recording and reproduction. The equalizer also converts the code format of the reproduced signal into a bipolar format according to the partial response system, and supplies a bipolar signal to an automatic threshold control circuit. The automatic threshold control circuit converts the output bipolar signal of the equalizer into a unipolar signal, by converting levels "+1" and "−1" of the bipolar signal into a level "+1" of the unipolar signal and maintaining a level "0" of the bipolar signal as a level "0" of the unipolar signal. Even if the level of the reproduced signal fluctuates when the signal level is being discriminated, the automatic threshold control circuit generates a reference signal (control voltage) which has a suitable time constant and follows the level fluctuation, so that the level comparison is carried out with the threshold values set to optimum values. The automatic threshold control circuit thus produces a digital signal which has been restored into the original unipolar signal which was obtained at the time of the recording.

When reproducing the recorded signal from the magnetic tape by the magnetic head, deterioration is sometimes introduced in the high frequency components of the reproduced signal and the amplitude of the reproduced signal decreases due to signal dropouts, as is well known. There are two major causes for such signal dropouts. A temporary or instantaneous signal dropout in which the level of the reproduced signal decreases for a relatively short period of time, is caused by foreign particles such as dust particles which are adhered on the magnetic layer. A permanent signal dropout in which the level of the reproduced signal decreases for a long period of time, is caused by the unevenly coated magnetic layer and the scratches on the magnetic layer.

Hence, because of the signal dropouts described above, the level fluctuations in the reproduced signal due to causes such as instability of the tape travel, and noise which is generated from the reproducing amplifier, the envelope of the reproduced signal accompanies level fluctuations with a long period, and the level of the sound voltage fluctuates. Furthermore, the amplitude of the reproduced signal decreases greatly due to the signal dropout. The period in which the amplitude of the reproduced signal decreases due to the signal dropout, is determined by the physical size of the dust particles and scratches on the magnetic layer, or the physical size of the dust particles on the surface of the head gap in the magnetic head, and the traveling speed of the magnetic tape. In some cases where the signal dropout is caused by minute dust particles, the level of the reproduced signal may decrease in a period which corresponds to one bit.

In the conventional magnetic recording and reproducing apparatus described heretofore, the automatic threshold control circuit included a pair of comparators. The bipolar signal was supplied to one input of each of these two comparators. Further, a reference signal which was obtained by subjecting the bipolar signal to a full-wave rectification and then passing the full-wave rectified signal through a smoothing circuit which has a time constant determined by a capacitor and a resistor, was supplied to the other input of each of these two comparators. Accordingly, it was possible for the automatic threshold control circuit to follow the effects of the signal dropout which caused the amplitude of the reproduced signal to decrease for a period which was sufficiently long with respect to the maximum repetition frequency (2-bit transmission period) of the reproduced signal. However, there was a problem in that the automatic threshold control circuit could not follow the effects of the instantaneous signal dropout which occurred within 1-bit transmission period.

In addition, the waveform equalization which was carried out in the equalizer was fixed regardless of the amplitude of the reproduced signal. Thus, when the signal dropout occurred, and also at the time of steady amplitude reproduction, the level comparison between the input reference signal and the input bipolar signal could not be carried out in a normal manner in the two comparators described before. This was mainly because the magnetic recording and reproducing frequency characteristics were inconsistent due to the magnetic material used for the magnetic tape, or because the reproducing frequency characteristics of the magnetic head was inconsistent in a multi-track magnetic recording and reproducing apparatus which simultaneously carries out recording and reproduction with respect to a plurality of tracks on the magnetic tape. This was one of the reasons why the code error occurred upon level discrimination in the automatic threshold control circuit.

Further, in the automatic threshold control circuit described before, the reference signal was generated from a reference signal generator within the automatic threshold control circuit. This reference signal generator was made up from a pair of switches which are supplied with positive and inverted phase outputs of a differential amplifier of the automatic threshold control circuit and are controlled of their open and closed states by a clock signal, a pair of diodes which rectify outputs of the switches, and a smoothing circuit comprising a capacitor and a resistor for smoothening the rectified output of the diodes. However, as is well known, the diodes have a non-linear forward voltage versus current characteristic, and a region which may be considered substantially linear is only in a range under 0.6 volts. Accordingly, when the level of the reproduced signal was adjusted so that the reference signal is obtained in the substantially linear region of the diodes, it became difficult to carry out the level comparison in level comparators with a satisfactory signal-to-noise (S/N) ratio. On the other hand, when the level of the reproduced signal was adjusted so that the reference signal is obtained in the non-linear region of the diodes, the voltage level of the reference signal which was obtained included the drops in the forward voltages of the diodes. Thus, this meant that an error is introduced in the value of the reference signal with respect to the input bipolar signal, and it was impossible to carry out an accurate level comparison.

In addition, in the multi-track magnetic recording and reproducing apparatus which simultaneously carries out the recording and reproduction with respect to a plurality of tracks which are formed parallel to each other in the longitudinal direction of the magnetic tape, for example, the error rate of the signals which are reproduced from the tracks is sensitive to the differences in the recording and reproducing characteristics of the tracks and to the differences in the characteristic of the head in the apparatus which actually carried out the recording and the characteristic of the head in a different apparatus which carries out the reproduction. Therefore, the levels of the reproduced signals had to be adjusted with extreme care. Such adjustment of the levels of the reproduced signal, may be carried out by adjusting the gain of an amplifier which is located in an input stage of the equalizer, for example.

Further, in the conventional magnetic recording and reproducing apparatus described heretofore, a smoothing capacitor having a large capacitance was required within the reference signal generator. Moreover, the pair of switches in the reference signal generator had to be high precision switches, but such high precision switches were difficult to make into an integrated circuit (IC). Hence, there was a problem in that the circuit construction of the reference signal generator was unfit for realization in the form of an integrated circuit.

SUMMARY OF THE INVENTION

Accordingly, it is a general object of the present invention to provide a novel and useful digital signal reproducing apparatus, in which the above described problems have been eliminated.

Another and more specific object of the present invention is to provide a digital signal reproducing apparatus which is designed to sample and hold a peak value of an output signal of an equalizer so as to produce a reference signal by voltage dividing the sampled and held signal, and to compare the level of the reference signal with the level of a signal which corresponds to the same bit and is obtained by delaying the output signal of the equalizer so as to produce a unipolar digital signal. According to the reproducing apparatus of the present invention, the recorded digital signal can be stably reproduced from a recording medium even when a signal dropout occurs due to a magnetic layer which is unevenly coated on the recording medium or due to minute dust particles adhered on the recording medium, because it is possible to reproduce even an instantaneous decrease in the amplitude of the reproduced bipolar signal when such instantaneous decrease occurs due to the signal dropout. Thus, in a case where the recording medium is a magnetic tape, the magnetic tape interchangeability among reproducing apparatuses is ensured. Moreover, when the present invention is applied to a multi-track recording and reproducing apparatus which comprises a stationary magnetic head with a plurality of gaps and simultaneously carries out the digital signal recording and reproduction with respect to a plurality of parallel tracks (multi-tracks) which are formed in the scanning direction of the magnetic recording medium so as to reduce the transmission bit rate, it is possible to absorb the inconsistencies in the signals which are reproduced from the plurality of tracks, and as a result, interchangeability is ensured among the tracks. This means that it is possible to ensure compatibility among a plurality of different recording and reproducing apparatuses, so that a magnetic tape which is recorded in one recording and reproducing apparatus can be stably played on another recording and reproducing apparatus.

Still another object of the present invention is to provide a digital signal reproducing apparatus which is designed to extract a timing component after a peak value or an average value of the reproduced bipolar signal from the equalizer is controlled to a constant value. According to the reproducing apparatus of the present invention, it is unnecessary to adjust the level of the reproduced signal although such a level adjustment of the reproduced signal was necessary in the conventional reproducing apparatus, and moreover, the level comparison can be carried out stably. Further, because a circuit which extracts the timing component also has an effect of absorbing jitter in the reproduced signal, it is possible to obtain a reproduced digital signal in which the jitter is eliminated.

A further object of the present invention is to provide a digital signal reproducing apparatus in which threshold values are set in an amplitude region where the reproduced unipolar digital signal from a level comparing circuit is considered to be zero in A.C., and the digital data in this amplitude region is discriminated as being a logic level "0". According to the reproducing apparatus of the present invention, even when a linking phenomenon occurs due to overshoots and the like in the amplitude region where the bipolar signal is considered to be zero in A.C. because of an insufficient waveform equalization in the equalizer, the digital signal can be reproduced stably and accurately independent of such a linking phenomenon.

Another object of the present invention is to provide a digital signal reproducing apparatus in which virtually all of the circuits are made up of digital circuits, so that the whole circuit can be realized in the form of a monolithic integrated circuit (IC). When the whole circuit is made in the form of a monolithic integrated circuit, there are notable advantages in that the apparatus can be downsized, the cost of the apparatus can be reduced, and the reliability of the apparatus is greatly improved.

Other objects and further features of the present invention will be apparent from the following detailed description when read in conjunction with the accompanying drawings.

DETAILED DESCRIPTION

Figure 1:
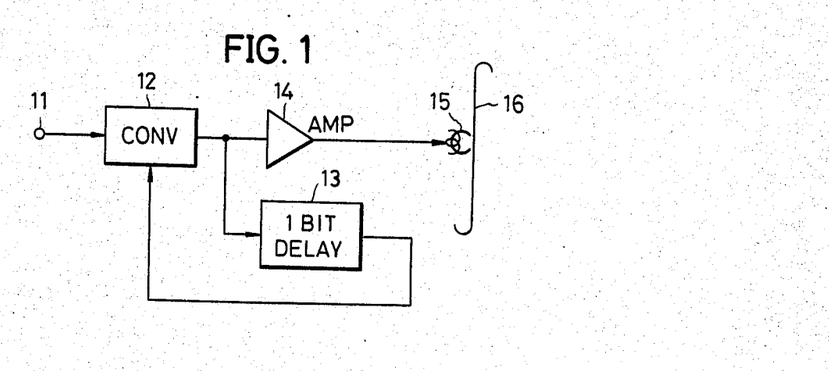
FIG. 1 is a systematic block diagram showing an example of a recording system which records a digital signal onto a magnetic tape which is to be played in a digital signal reproducing apparatus according to the present invention.

First, description will be given with respect to a recording system which records a digital signal onto a magnetic tape which is to be played in a digital signal reproducing apparatus according to the present invention. In FIG. 1, a unipolar digital signal shown in FIG. 2(A) which is to be recorded, is applied to an input terminal 11. This unipolar digital signal is obtained by subjecting an analog audio signal, for example, to a pulse code modulation (PCM). In the digital signal waveform shown in FIG. 2(A), the numbers indicated above the signal waveform respectively indicate the value of the original data in each of the bits. The input digital signal is passed through a converter 12 and is then supplied to a 1-bit delay element (or a 2-bit delay element) 13 wherein the digital signal is delayed by one bit transmission period. The delayed output digital signal of the 1-bit delay element 13 is fed back to the converter 12 wherein the delayed digital signal is subjected to a modulo-2 addition (exclusive-OR operation) with a subsequent 1-bit input digital signal, and the converter 12 thus produces a unipolar digital signal which is to be recorded. This output unipolar digital signal of the converter 12 is shown in FIG. 2(B). The output unipolar digital signal of the converter 12 is supplied to the 1-bit delay element 13 and to a recording amplifier 14. The recording amplifier 14 produces a signal shown in FIG. 2(C), and supplies this signal to a recording magnetic head 15 which records this signal onto a magnetic tape 16. In other words, the digital signal shown in FIG. 2(A) is converted into the signal having the format shown in FIG. 2(C) according to the partial response system, and is recorded on the magnetic tape 16.

Figure 3:
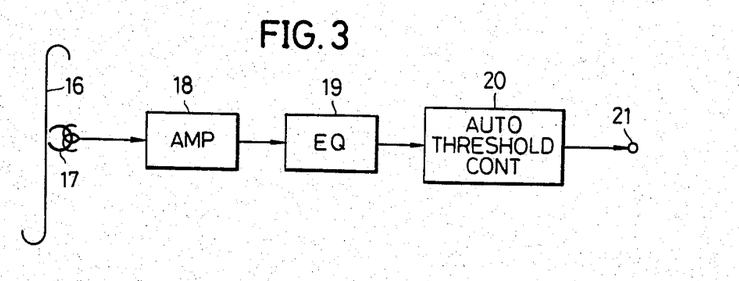
FIG. 3 is a systematic block diagram showing the general construction of a digital signal reproducing apparatus according to the present invention.

The magnetic tape 16 which is recorded with the digital signal in the above described manner, is generally played in a reproducing apparatus which has a block system shown in FIG. 3. The recorded signal is reproduced from the magnetic tape 16 by a reproducing head 17. The reproduced signal has a pulse waveform which assumes a positive polarity when the recording current undergoes a transition from negative to positive polarity, and assumes a negative polarity when the recording current undergoes a transition from positive to negative polarity, due to the differential characteristic of the reproducing system which is based on the characteristic of the winding of the reproducing head 17. The reproduced signal is amplified in a reproducing amplifier 18, and is then supplied to an equalizer 19. The equalizer 19 compensates for the high frequency components which are attenuated during the process of the magnetic recording and reproduction. The equalizer 19 also obtains a bipolar signal shown in FIG. 3(D) in order to convert the code format of the reproduced signal into a bipolar format according to the partial response system.

Figure 2:
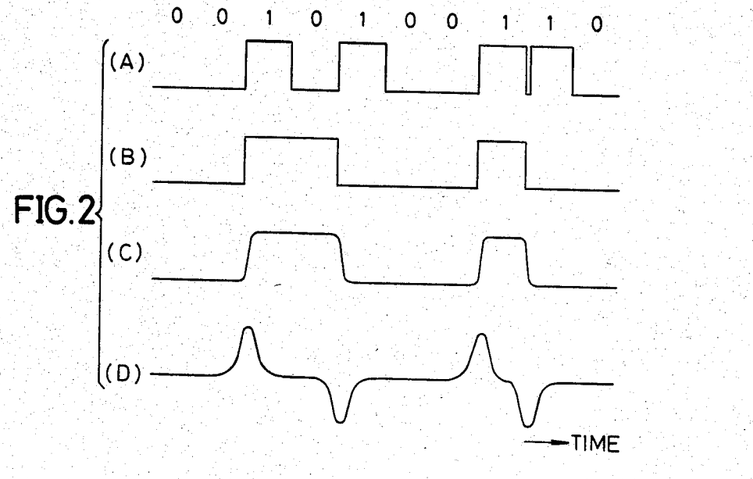
FIGS. 2(A) through 2(D) are graphs respectively showing signal waveforms for explaining the operation of the block system shown in FIG. 1 and an output signal waveform of an equalizer in a reproducing system.

The bipolar signal has signal levels corresponding to "+1", "0" and "−1" as shown in FIG. 2(D), and is supplied to an automatic threshold control circuit 20. The automatic threshold control circuit 20 converts the output bipolar signal of the equalizer 19 into a unipolar signal, by converting levels "+1" and "−1" of the bipolar signal into a level "+1" of the unipolar signal and maintaining a level "0" of the bipolar signal as a level "0" of the unipolar signal. Even if the level of the reproduced signal fluctuates when the signal level is being discriminated, the automatic threshold control circuit 20 generates a reference signal (control voltage) which has a suitable time constant and follows the level fluctuation, so that the level comparison is carried out with the threshold values set to optimum values. The automatic threshold control circuit 20 thus produces a digital signal which has been restored into the original unipolar digital signal which was obtained at the time of the recording, through an output terminal 21.

Figures 4, 5, 6:
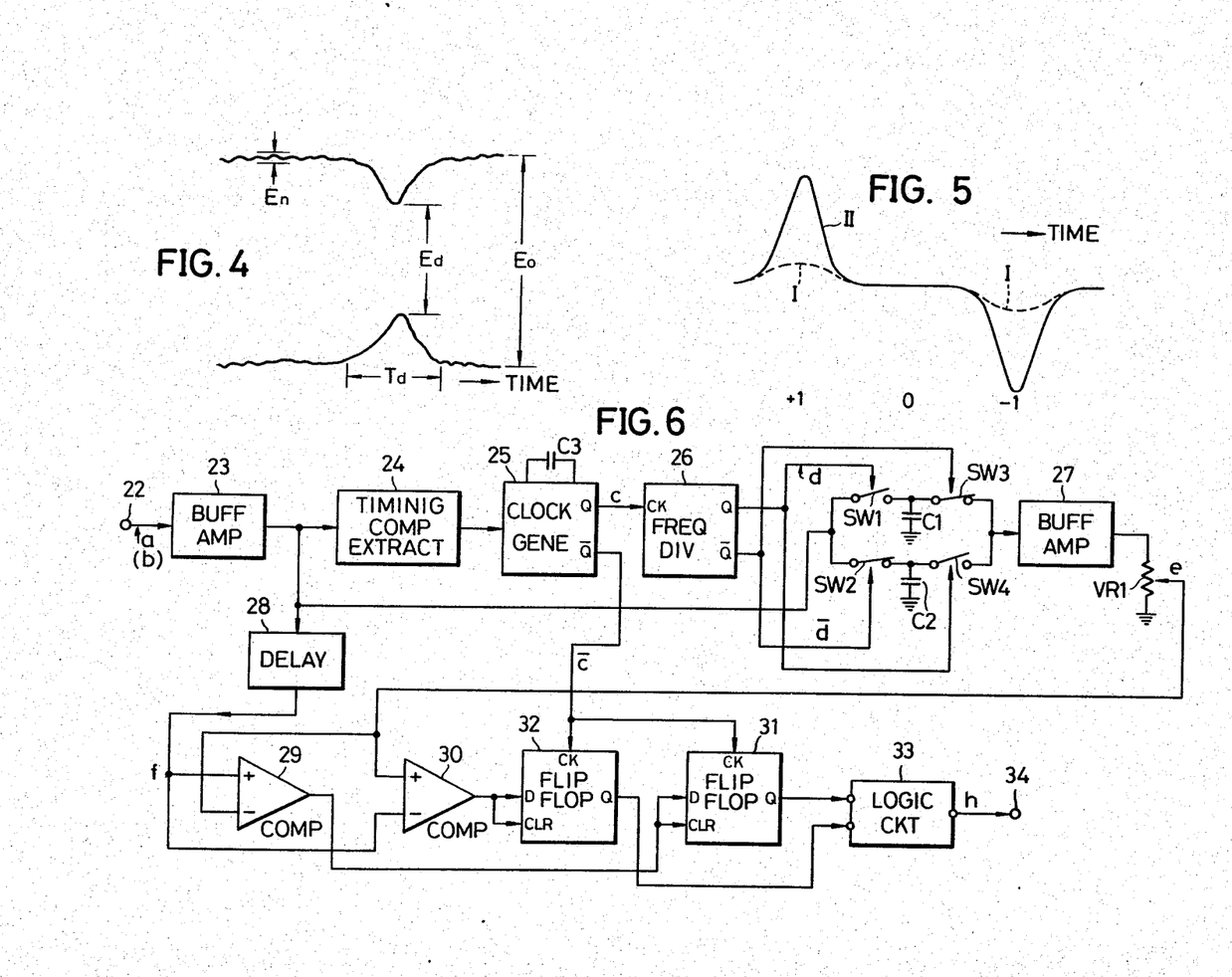
FIG. 4 shows an example of the waveform of a reproduced signal which is obtained when a signal dropout occurs.
FIG. 5 shows the waveform of a normally reproduced signal and the waveform of the reproduced signal which is obtained when the signal dropout occurs, for comparing the two signal waveforms.
FIG. 6 is a systematic circuit diagram showing a first embodiment of a digital signal reproducing apparatus according to the present invention.
Figure 7:
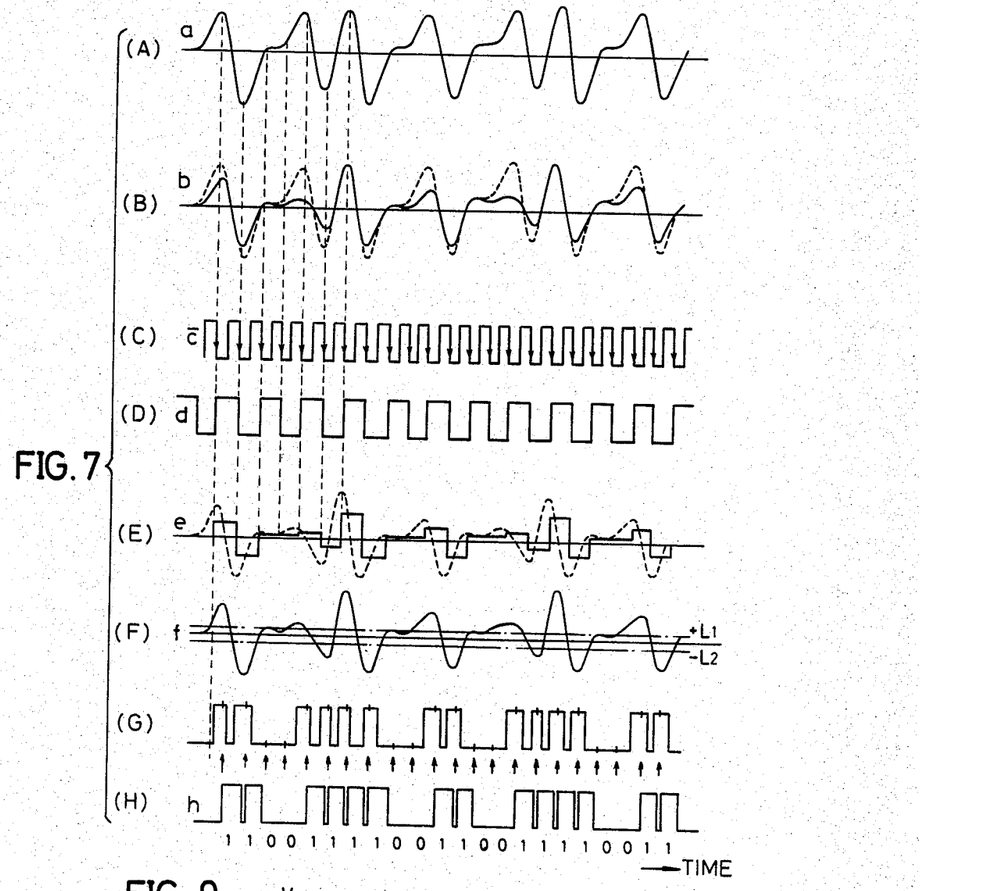
FIGS. 7(A) through 7(H) are graphs respectively showing signal waveforms for explaining the operation of the digital signal reproducing apparatus according to the present invention.

The envelope of the reproduced signal becomes as shown in FIG. 4 when observed, due to level fluctuations in the reproduced signal which are caused by signal dropouts and instability of the tape travel, and further due to noise which is generated in the reproducing amplifier 18. In FIG. 4, a steady amplitude $E_o$ of the reproduced signal includes level fluctuations which occur over a long period, and $E_n$ indicates the level fluctuation in the noise voltage. Further, the amplitude of the reproduced signal greatly decreases as indicated by $E_d$ when a signal dropout occurs. The signal dropout may cause the level of the reproduced signal to decrease in a period which corresponds to one bit as indicated by a broken line in FIG. 5. In FIG. 5, a solid line II indicates the waveform of the bipolar signal which is obtained when the amplitude of the reproduced signal is steady.

According to the present invention, the automatic threshold control circuit 20 is designed so that it is possible to follow the effects of an instantaneous signal dropout which occurs within one bit transmission period, and embodiments of the present invention will hereinafter be described in conjunction with FIGS. 6 through 11.

FIG. 6 is a systematic circuit diagram showing a first embodiment of the digital signal reproducing apparatus according to the present invention. In FIG. 6, the reproduced bipolar signal from the equalizer 19 shown in FIG. 3, is applied to an input terminal 22. This reproduced bipolar signal assumes the form of a signal a shown in FIG. 7(A) when the amplitude is steady upon reproduction. On the other hand, when the signal dropout occurs, the reproduced bipolar signal assumes the form of a signal b which is indicated by a solid line in FIG. 7(B). The input bipolar signal a or b is passed through a buffer amplifier 23, and is then supplied to a timing component extracting circuit 24, switches $SW_1$ and $SW_2$, and a delay circuit 28. The buffer amplifier 23 has a low output impedance characteristic so as to sufficiently charge capacitors $C_1$ and $C_2$, through the timing component extracting circuit 24, the delay circuit 28, and the switches $SW_1$ and $SW_2$. However, the buffer amplifier 23 may be an ordinary amplifier having a certain gain.

The timing component extracting circuit 24 is constituted by a full-wave rectifying circuit and a resonant circuit. Various rectifying circuits such as a bridge rectifying circuit which employs diodes, may be used for the full-wave rectifying circuit. In the present embodiment, the full-wave rectifying circuit is designed to compare the level of the input bipolar signal a or b with positive and negative threshold values, and to produce a unipolar pulse train by considering a period in which the input bipolar signal a or b is greater than the positive threshold value and a period in which the input bipolar signal a or b is less than the negative threshold value as being the logic level "0". This unipolar pulse train is supplied to the resonant circuit. The resonant circuit which is employed in the timing component extracting circuit 24, may be an L-C tank circuit. When using an integrated circuit for the resonant circuit, a gyrator, a bandpass filter, and the like may also be employed as long as the required Q is obtainable. The signal which excites the resonant circuit, may be a unipolar pulse train as in the present embodiment, and may also be an analog voltage which is obtained after the full-wave rectification.

The timing component of one bit transmission period, which is extracted from the input bipolar signal a or b in the timing component extracting circuit 24, is supplied to a clock generator 25 wherein the timing component is converted into a clock signal having a predetermined repetition period (one bit transmission period). The clock generator 25 is made up from a comparing circuit which comprises a positive phase output terminal Q and an inverted phase output terminal $\bar{Q}$, and a capacitor $C_3$. The capacitor $C_3$ performs integration and adjusts the phase, so that the positive and negative peaks (+1 and −1) in the output bipolar signal of the buffer amplifier 23 coincide with a rising edge ($\bar{Q}$) and a trailing edge (Q) in the output clock signal of the clock generator 25. A clock signal which is obtained through the Q-output terminal of the clock generator 25, is applied to a clock input terminal of a ½-frequency divider 26. On the other hand, a clock signal $\bar{c}$ shown in FIG. 7(C) which is obtained through the $\bar{Q}$-output terminal of the clock generator 25, is applied to a clock input terminal of a delay type (D-type) flip-flop 31 and to a clock input terminal of a D-type flip-flop 32. Description on these flip-flops 31 and 32 will be given later on in the specification.

Because the maximum repetition frequency of the input bipolar signal a or b is two bit transmission period, the ½-frequency divider 26 frequency-divides by ½ the output signal of the timing component extracting circuit 24 which is resonant in one bit transmission period. Thus, a control signal d shown in FIG. 7(D) which has a two bit transmission period, is produced through the Q-output terminal of the frequency divider 26. On the other hand, a control signal $\bar{d}$ having the inverted phase of the control signal d, is produced through the $\bar{Q}$-output terminal of the frequency divider 26. The control signal d controls the switching of the sampling and holding switch $SW_1$ and a multiplexing switch $SW_4$. The control signal $\bar{d}$ controls the switching of the sampling and holding switch $SW_2$ and a multiplexing switch $SW_3$. One contact of the switch $SW_1$ and one contact of the switch $SW_2$, are commonly coupled to the output terminal of the buffer amplifier 23. Further, the other contact of the switch $SW_1$ is coupled to one contact of the switch $SW_3$, and the other contact of the switch $SW_2$ is coupled to one contact of the switch $SW_4$. The other contact of the switch SW$_3$ and the other contact of the switch SW$_4$ are commonly coupled to an input terminal of a buffer amplifier 27 which has a high input impedance. A common connection point between the switches SW$_1$ and SW$_3$ is grounded through a bi-directional capacitor C$_1$ which will charge and discharge with respect to both positive and negative voltages. In addition, a connection point between the switches SW$_2$ and SW$_4$ is grounded through a bi-directional capacitor C$_2$.

The switches SW$_1$ through SW$_4$ are electronic switches, and are designed to normally and selectively pass both positive and negative voltages. Thus, it is possible to charge and discharge both positive and negative voltages in and from the capacitors C$_1$ and C$_2$. Such measures are taken since the incoming bipolar signal may not always alternately assume the levels "+1" and "−1" or the levels "+1", "0", and "−1". That is, such measures are taken so that the present invention can also be applied to a case where the signal has been converted into a code format in which the bipolar signal continuously assumes the level "+1" and "+1", or the level "−1" and "−1", in succession. Another reason for taking such measures, is because the signal voltage which is sampled and held in the switches SW$_1$ through SW$_4$ and the capacitors C$_1$ and C$_2$, assumes a slight positive or negative voltage even in a region where the signal should actually be zero in A.C., when an overshoot exists in the reproduced signal waveform due to inter-symbol interference.

The object of the waveform equalization of the digital signal, is not to correctly reproduce the transmitted signal waveform or the recorded signal waveform. The actual object of the waveform equalization is to obtain an optimum signal waveform which has been received, so that the transmitted codes can be correctly discriminated. The partial response system is well known for positively utilizing the inter-symbol interference, and the polarity of the slight voltage in the region where the sampled and held signal voltage should actually be zero in A.C. is not fixed in most cases.

Next, description will be given with respect to the sampling and holding operation which is carried out by the switches SW$_1$ through SW$_4$ and the capacitors C$_1$ and C$_2$. It will be assumed that the switches SW$_1$ through SW$_4$ are closed (ON) when the control signals d and $\bar{d}$ assume the logic level "0", and that the switches SW$_1$ through SW$_4$ are open (OFF) when the control signals d and $\bar{d}$ assume the logic level "1". Under this assumption, during one bit transmission period in which the control signal d assumes the logic level "0" and the control signal $\bar{d}$ assumes the logic level "1", the switch SW$_1$ is ON and the switch SW$_2$ is OFF. Thus, in this case, the output bipolar signal a or b of the buffer amplifier 23 is charged in the capacitor C$_1$. Moreover, because the switch SW$_3$ is OFF and the switch SW$_4$ is ON, the peak value of the bipolar signal a or b of an immediately preceding one bit transmission period which signal a or b was charged and held in the capacitor C$_2$, is discharged and supplied to the buffer amplifier 27 through the switch SW$_4$.

In addition, during one bit transmission period in which the control signal d assumes the logic level "1" and the control signal $\bar{d}$ assumes the logic level "0", the switch SW$_1$ is OFF and the switch SW$_2$ is ON. Hence, the bipolar signal a or b is charged in the capacitor C$_2$. Further, since the switch SW$_3$ is ON and the switch SW$_4$ is OFF, the peak value of the bipolar signal a or b of an immediately preceding one bit transmission period which signal a or b was charged and held in the capacitor C$_1$, is discharged and supplied to the buffer amplifier 27 through the switch SW$_3$. The above described operations for the case where the control signal d assumes the logic level "0" and the control signal $\bar{d}$ assumes the logic level "1", and the operations for the case where the control signal d assumes the logic level "1" and the control signal $\bar{d}$ assumes the logic level "0", are similarly carried out alternately thereafter.

The logic level of the control signal d undergoes a transition from "0" to "1" at a positive peak of the bipolar signal a or b representing the logic level "1", and undergoes a transition from "1" to "0" at a negative peak of the bipolar signal a or b representing the logic level "1". Hence, the switch SW$_1$ is turned ON prior to the positive peak of the bipolar signal a or b, and the voltage obtained prior to the positive peak of the bipolar signal a or b is charged in the capacitor C$_1$. The switch SW$_1$ is turned OFF and the switch SW$_3$ is turned ON subsequent to the positive peak of the bipolar signal a or b, and the positive peak voltage which has charged in the capacitor C$_1$ will tend to discharge through the switch SW$_3$. However, because the switch SW$_4$ is OFF and the buffer amplifier 27 has a high input impedance, there is no discharge path for the positive peak voltage which is charged in the capacitor C$_1$. In other words, only an exceedingly small current will pass through the buffer amplifier 27, and the positive peak voltage will remain charged in the capacitor C$_1$. Therefore, the positive peak voltage of the bipolar signal a or b is applied to a variable resistor VR$_1$ through the buffer amplifier 27 substantially without loss, because of a low output impedance of the buffer amplifier 27.

Similarly, the negative peak voltage of the bipolar signal a or b remains charged in the capacitor C$_2$, and this negative peak voltage is applied to the variable resistor VR$_1$ through the buffer amplifier 27. The switching of the switches SW$_1$ and SW$_2$ are controlled so that one of these switches SW$_1$ and SW$_2$ is ON when the other switch is OFF. Moreover, the switch SW$_3$ carries out a switching operation which is opposite to the switching operation of the switch SW$_1$, while the switch SW$_4$ carries out a switching operation which is opposite to the switching operation of the switch SW$_2$. Thus, the positive peak voltage which remains charged in the capacitor C$_1$ and the negative peak voltage which remains charged in the capacitor C$_2$, are alternately applied to the variable resistor VR$_1$ through the buffer amplifier 27. A reference signal e shown in FIG. 7(E) is constantly obtained through a slider of the variable resistor VR$_1$. This reference signal e is obtained by voltage-dividing the positive or negative peak voltage of the bipolar signal a or b for every one bit transmission period.

In other words, a voltage which is obtained by sampling and holding the input bipolar signal a or b for every one bit transmission period, is voltage-divided in order to obtain the reference signal e which is produced through the slider of the variable resistor VR$_1$. The reference signal e is applied to an inverting input terminal of a comparator 29 and to a non-inverting input terminal of a comparator 30, as a threshold value which is used for code discrimination of the bipolar signal a or b. The voltage dividing ratio of the variable resistor VR$_1$ is determined by a rate of opening in the eye-pattern which is obtained due to the waveform equalization, but the variable resistor VR$_1$ may be replaced by a bleeder circuit employing fixed resistors if the optimum voltage dividing ratio is known.

The bipolar signal a or b which has been delayed in the delay circuit 28, is applied to a non-inverting input terminal of the comparator 29 and to an inverting input terminal of the comparator 30. The delay circuit 28 is provided in order to compensate for a time lag of the reference signal e which is produced through the slider of the variable resistor $VR_1$ after the output bipolar signal a or b of the buffer amplifier 27 is subjected to a signal processing which includes the sample and hold. Hence, the delay circuit 28 is designed to delay the signal by approximately ½ the one bit transmission period. Accordingly, if this delay time can be set, the delay circuit 28 may be constituted by charge transfer elements such as a bucket brigade device (BBD) and a charge coupled device (CCD). Further, the delay circuit 28 may be constituted by a phase shifter including an operational amplifier and a capacitor. However, it is desirable to design the delay circuit 28 so that there is no waveform distortion in the delayed bipolar signal.

The comparator 29 compares the level of the bipolar signal from the delay circuit 28, with the level of the reference signal e. The comparator 29 produces a signal indicating a logic level "1" when the bipolar signal level is higher than the level of the reference signal e, and produces a signal indicating a logic level "0" when the bipolar signal level is lower than the level of the reference signal e. The output signal of the comparator 29 is applied to a data input terminal and to a clear terminal of the flip-flop 31. On the other hand, the comparator 30 compares the level of the bipolar signal from the delay circuit 28, with the level of the reference signal e. The comparator 30 produces a signal indicating a logic level "1" when the bipolar signal level is lower than the level of the reference signal e, and produces a signal indicating a logic level "0" when the bipolar signal level is higher than the level of the reference signal e. The output signal of the comparator 30 is applied to a data input terminal and to a clear terminal of the flip-flop 32. A bipolar signal f shown in FIG. 7(F) is produced from the delay circuit 28 when the bipolar signal b is applied to the input terminal 22, and in this case, the reference signal e assumes a waveform indicated by a solid line in FIG. 7(E). In FIG. 7(E), the bipolar signal f is indicated by a broken line. Accordingly, in this case, a signal shown in FIG. 7(G) is obtained if the output signals of the comparators 29 and 30 are respectively passed through an OR circuit.

The clock signal $\bar{c}$ which is produced through the $\bar{Q}$-output terminal of the clock generator 25, is applied to the clock input terminals of the flip-flops 31 and 32. Because the flip-flops 31 and 32 are respectively designed to latch the input signals which are applied to the data input terminal thereof when the logic level of the clock signal $\bar{c}$ undergoes a transition from "0" to "1", the output signals of the flip-flops 31 and 32 will continue to assume the logic level "1" over two bit transmission period, if a signal which continues to assume the logic level "1" over two bit transmission period is applied to the data input terminals of the flip-flops 31 and 32. However, in the present embodiment, the signals which are applied to the data input terminals of the flip-flops 31 and 32, are also applied to the clear terminals of the flip-flops 31 and 32. As a result, the flip-flops 31 and 32 are respectively cleared in a state where the output signals of the comparators 29 and 30 assume the logic level "0", so that digital signals which are constituted by pulse trains in terms of the desired one bit are obtained. In FIG. 7(G), the positions which correspond to the rising edges of the clock signal $\bar{c}$, are indicated below the signal waveform.

The unipolar digital signals which are obtained from the flip-flops 31 and 32, are respectively supplied to a logic circuit 33. This logic circuit 33 may be an OR circuit. When an OR circuit constitutes the logic circuit 33, the digital signal which is produced from the OR circuit will include jitter in a period in which the logic level is "1". This is because the points on the time base where the logic levels of the digital signals which are produced from the flip-flops 31 and 32 undergo a transition from "0" to "1", are controlled by the clock signal $\bar{c}$ from the clock generator 25, while the points on the time base where the logic levels of these digital signals from the flip-flops 31 and 32 undergo a transition from "1" to "0", are controlled by output signals of the comparators 29 and 30 which assume the logic level "0" and clear the flip-flops 31 and 32. On the other hand, the resonant circuit in the timing extracting circuit 24 absorbs the jitter which is included in the input bipolar signal. Hence, it is desirable that the digital signal which is produced from the logic circuit 33 and obtained through an output terminal 34, is discriminated solely by the clock signals c and $\bar{c}$ from the clock generator 25.

Accordingly, when the logic circuit 33 is constituted by a 2-input OR circuit and a monostable multivibrator which is triggered by a rising edge of an output signal of the 2-input OR circuit, a digital signal h shown in FIG. 7(H) in which the jitter has been absorbed, is produced from this monostable multivibrator and obtained through the output terminal 34. This digital signal h has a signal waveform in which the logic levels "1" and "0" correspond to the levels of the original digital signal.

Therefore, even when the bipolar signal b applied to the input terminal 22 includes an instantaneous signal dropout which is caused by minute dust particles which are adhered on the magnetic tape and the like, for example, the peak levels of the signal waveform which has a decreased level due to the signal dropout are sampled and held. The sampled and held signal is subjected to a voltage division to obtain the reference signal e, and the level of the bipolar signal f is compared with the level of this reference signal e at the corresponding bit positions. Thus, it is possible to accurately obtain the reproduced digital signal h, by controlling the pulse width and the pulse position of the unipolar digital signal which is obtained by use of the clock signal $\bar{c}$ which is produced from the timing component.

When the logic circuit 33 is constituted by a monostable multivibrator which is triggered by a trailing edge, the $\bar{Q}$-output signals of the flip-flops 31 and 32 should be supplied to the logic circuit 33. In addition, the logic circuit 33 may be constituted by an OR circuit and a D-type flip-flop, and the logic circuit 33 may be designed with much freedom. When the logic circuit 33 is constituted by the OR circuit and the D-type flip-flop, the number of gates can be reduced when designing the logic circuit 33.

Figure 8:
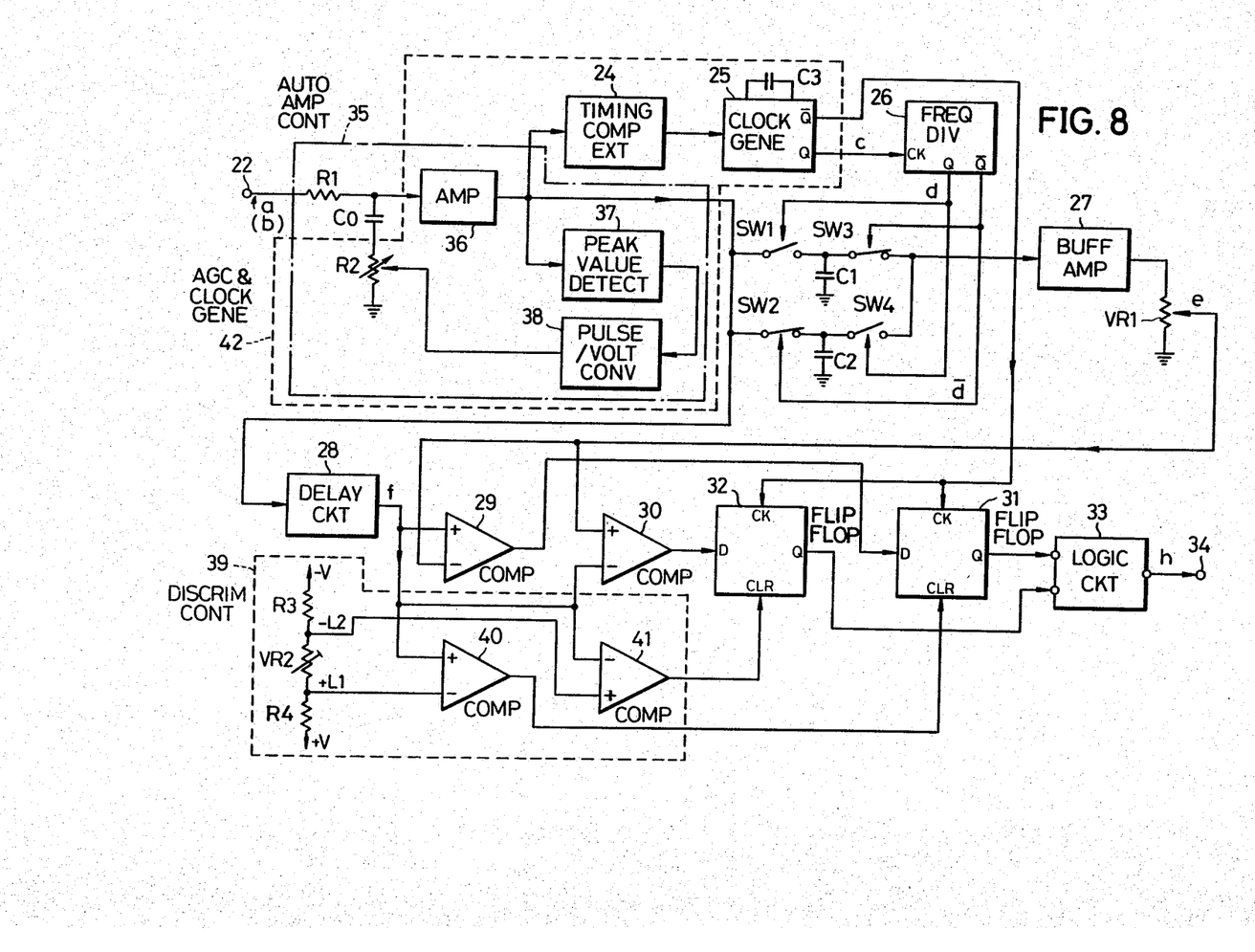
FIG. 8 is a systematic circuit diagram showing a second embodiment of a digital signal reproducing apparatus according to the present invention.

Next, description will be given with respect to a second embodiment of a digital signal reproducing apparatus according to the present invention. FIG. 8 shows a systematic circuit diagram of the second embodiment of the invention. In FIG. 8, those parts which are the same as those corresponding parts in FIG. 6 are designated by the same reference numerals, and their description will be omitted. The bipolar signal a or b applied to the input terminal 22, is supplied to an amplifier 36 through an A.C. attenuator circuit within an automatic amplitude control circuit 35. This attenuator circuit comprises a resistor $R_1$, a capacitor $C_0$, and a variable resistor $R_2$. The bipolar signal which is amplified in the amplifier 36, is supplied to a peak value detecting circuit 37 wherein the positive and negative peak values of the bipolar signal are detected. The peak value detecting circuit 37 compares the level of the bipolar signal with preset positive and negative threshold values. This peak value detecting circuit 37 produces a unipolar negative polarity pulse which assumes the logic level "0" during a period in which the level of the input bipolar signal is higher than the positive threshold value and during a period in which the level of the input bipolar signal is lower than the negative threshold value, and assumes the logic level "1" during other periods, for every peak value of the input bipolar signal.

The negative polarity pulse from the peak value detecting circuit 37, is supplied to a pulse-to-voltage (pulse/voltage) converting circuit 38 as a peak value detection signal. The negative polarity pulse supplied to the pulse/voltage converting circuit 38, is converted into a voltage having a level which is dependent on the number of pulses per unit time. The output voltage of the pulse/voltage converting circuit 38 is applied to the variable resistor $R_2$ as a control voltage, to variably control the resistance of the variable resistor $R_2$.

Figure 9:
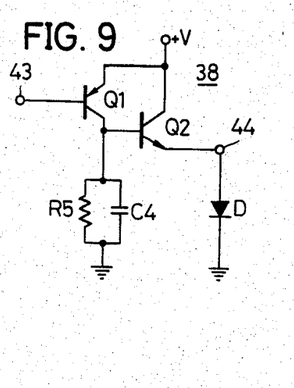
FIG. 9 is a circuit diagram showing an embodiment of a pulse-to-voltage converter in the circuit system shown in FIG. 8.

The above pulse/voltage converting circuit 38 may have a simple circuit construction shown in FIG. 9, for example. In FIG. 9, an input terminal 43 is coupled to a base of a PNP type transistor $Q_1$, and a collector of this transistor $Q_1$ is coupled to a base of an NPN type transistor $Q_2$. The collector of the transistor $Q_1$ is also grounded through a parallel circuit consisting of a capacitor $C_4$ and a resistor $R_5$. An emitter of the transistor $Q_2$ is coupled to an anode of a diode D through an output terminal 44, as an open-emitter output terminal. A cathode of the diode D is grounded. The internal resistance of the diode D varies according to its forward voltage versus current characteristic, and constitutes the variable resistor $R_2$ shown in FIG. 8.

The capacitor $C_4$ is a charging and discharging capacitor. A discharging time constant of the capacitor $C_4$, is determined by the capacitance of the capacitor $C_4$ and the resistance of the resistor $R_5$. If this discharging time constant of the capacitor $C_4$ is selected to a value which is too small, the internal resistance of the diode D will vary instant by instant, and this will introduce an undesirable ripple in the input voltage of the amplifier 36. On the other hand, if the above discharging time constant is selected to a value which is too large, the change in the output voltage with respect to the number of input negative polarity pulses applied to the input terminal 43 becomes extremely gradual, and the desired pulse-to-voltage conversion characteristic cannot be obtained. Accordingly, by taking the above into consideration, the discharging time constant is selected to a value which is in the range of ten times the maximum repetition period of the input negative polarity pulse, for example.

The peak value detection signal (negative polarity pulse) which is applied to the input terminal 43, normally assumes the logic level "1", and assumes the logic level "0" only when the peak value is detected, as shown in FIG. 10(A). When the logic level of the peak value detection signal is "1", the transistor $Q_1$ is turned OFF, and the transistor $Q_1$ is turned ON when the logic level of the peak value detection signal is "0". When the transistor $Q_1$ is ON, a current flows to the resistor $R_5$ through the emitter and collector of the transistor $Q_1$, from an input terminal which is applied with a power source voltage V, and moreover, an average of the collector current of the transistor $Q_1$ is charged in the capacitor $C_4$. The voltage which is charged in the capacitor $C_4$, assumes a waveform shown in FIG. 10(B). This charged voltage in the capacitor $C_4$ is applied to the base of the transistor $Q_2$ as a base bias voltage, and a current is accordingly applied to the diode D through the emitter of the transistor $Q_2$. As a result, the drop in the forward voltage of the diode D undergoes an approximately linear change in a range of 0.2 volt to 1 volt, for example. The attenuation in the attenuator circuit which is constituted by the variable resistor $R_2$ and the resistor $R_1$, changes according to the change in the internal resistance of the diode D as the drop in the forward voltage undergoes such an approximately linear change. In FIG. 8, the capacitor $C_0$ blocks the D.C. current.

Therefore, the automatic amplitude control circuit 35 carries out control so that the positive and negative peak values of the input bipolar signal a or b become constant. The output signal of the automatic amplitude control circuit 35 is supplied to the timing component extracting circuit 24, the switches $SW_1$ and $SW_2$, and the delay circuit 28. In the conventional apparatus, a level adjusting operation had to be carried out with respect to the reproduced signal upon steady amplitude reproduction, due to the inconsistency in the magnetic recording and reproducing amplitude characteristics which are based on the magnetic material used for the magnetic tape or due to the inconsistency in the recording and reproducing amplitude characteristics of the magnetic head in the multi-track magnetic recording and reproducing apparatus, in addition to carrying out the operation with respect to the signal dropout described previously. However, by the provision of the automatic amplitude control circuit 35, it is unnecessary to carry out a level adjusting operation with respect to the reproduced signal upon steady amplitude reproduction. Furthermore, the timing component can be extracted in an extremely stable state, because the bipolar signal of constant amplitude is supplied to the timing component extracting circuit 24, the sample and hold circuit which is constituted by the switches $SW_1$ through $SW_4$ and the capacitors $C_1$ and $C_2$, and further to the comparators 29 and 30 through the delay circuit 28. Hence, the clock signals can be generated stably, and moreover, the level comparison can also be carried out stably.

The bipolar signal which is obtained from the delay circuit 28, is supplied to a discrimination control circuit 39 wherein the digital signal correctly discriminated and reproduced even when the waveform equalization is poor. The discrimination control circuit 39 comprises a resistor $R_3$, a variable resistor $VR_2$, and a resistor $R_4$ which are coupled in series between an input terminal for a negative power source voltage $-V$ and an input terminal for a positive power source voltage $+V$, and comparators 40 and 41. The resistors $R_3$ and $R_4$ and the variable resistor $VR_2$ constitute a threshold generating circuit. A positive threshold voltage $+L_1$ is obtained from a connection point between the resistor $R_4$ and the variable resistor $VR_2$, and is supplied to an inverting input terminal of the comparator 40. On the other hand, a negative threshold voltage $-L_2$ is obtained from a connection point between the resistor $R_3$ and the variable resistor $VR_2$, and is supplied to a non-inverting input terminal of the comparator 41.

The comparator 40 compares the level of the bipolar signal f shown in FIG. 7(F), for example, which is produced from the delay circuit 28 and applied to the non-inverting input terminal of the comparator 40, with the level of the positive threshold voltage $+L_1$ shown in FIG. 7(F). As shown in FIG. 7(F), the bipolar signal f includes an instantaneous decrease in the signal level which is caused by the instantaneous signal dropout. The comparator 40 produces a signal which assumes a logic level "1" during a period in which the level of the bipolar signal f is greater than the level of the positive threshold voltage $+L_1$, and assumes a logic level "0" during other periods. The output signal of the comparator 40 is applied to the clear terminal of the flip-flop 31.

On the other hand, the comparator 41 compares the level of the bipolar signal f which is applied to the non-inverting input terminal thereof, with the level of the negative threshold voltage $-L_2$ shown in FIG. 7(F). The comparator 41 produces a signal which assumes a logic level "1" during a period in which the level of the bipolar signal f is less than the level of the negative threshold voltage $-L_2$, and assumes a logic level "0" during cther periods. The output signal of the comparator 41 is applied to the clear terminal of the flip-flop 32.

The timing with which the reproduced bipolar signal a or b is extracted, is determined by the clock signals which are generated from the clock generator 25 based on the output signal of the timing component extracting circuit 24. The timing information of each bit is obtained by comparing the signal f with the reference signal e at points on the time base which correspond to positive and negative peaks of the signal f. In other words, the signal f may assume any shape during periods other than the period (data discriminating time slot) in which each bit is obtained. Accordingly, because the automatic amplitude control circuit 35 has a flat amplitude versus frequency characteristic, the decrease in the high frequency component of the reproduced signal due to the signal dropout cannot be compensated for as in the case of the first embodiment described previously. However, even when there is a decrease in the level which is caused by the signal dropout, there will exist peaks at the points on the time base where the peaks should occur. It has been found experimentally that the error rate will not deteriorate even if there is a decrease in the high frequency component.

On the other hand, the waveform equalization which is carried out in the equalizer 19 shown in FIG. 3, is generally carried out to make the signal-to-noise (S/N) ratio a maximum at the discriminating point so that the code error becomes a minimum. However, according to some transmission characteristic of the recording and reproduction or the transmission and reception, an overshoot may occur if the S/N ratio is set to a maximum at the discriminating point. Thus, if such a waveform equalization is carried out, a linking phenomenon due to the overshoot will occur in the region where the amplitude of the bipolar signal a or b should indicate zero in A.C., and it will become difficult to discriminate the amplitude information of the bipolar signal which actually indicates the logic level "0".

Accordingly, in the present embodiment, the threshold voltages $+L_1$ and $-L_2$ in the positive and negative regions where the amplitude of the bipolar signal is discriminated as being zero in A.C., are set in the variable resistor $VR_2$ so as to positively discriminate the logic level "0". That is, according to the present embodiment, the output signals of the comparators 40 and 41 are respectively applied to the clear terminals of the flip-flops 31 and 32, and the flip-flops 31 and 32 each produce a signal of the logic level "0" through the Q-output terminal thereof regardless of the input data when the output signals of the comparators 40 and 41 assume the logic level "0". Hence, even when the linking phenomenon occurs due to the overshoot in the region where the bipolar signal should by zero in A.C., the digital data indicating the logic level "0" can be correctly produced by adjusting the variable resistor $VR_2$.

According to the principle of the present embodiment, the logic level of the bipolar signal may be assumed to be "0" in periods other than the period in which the discrimination is carried out. However, in actually practice, the points of the peaks on the time base may be shifted due to inter-symbol interference, and for this reason, the flip-flops 31 and 32 are designed to operate only when applied with a signal which is greater than a predetermined threshold value.

Thus, according to the present embodiment, the digital signal h can be reproduced accurately even when the incoming bipolar signal had been subjected to an incomplete waveform equalization.

Figure 11:
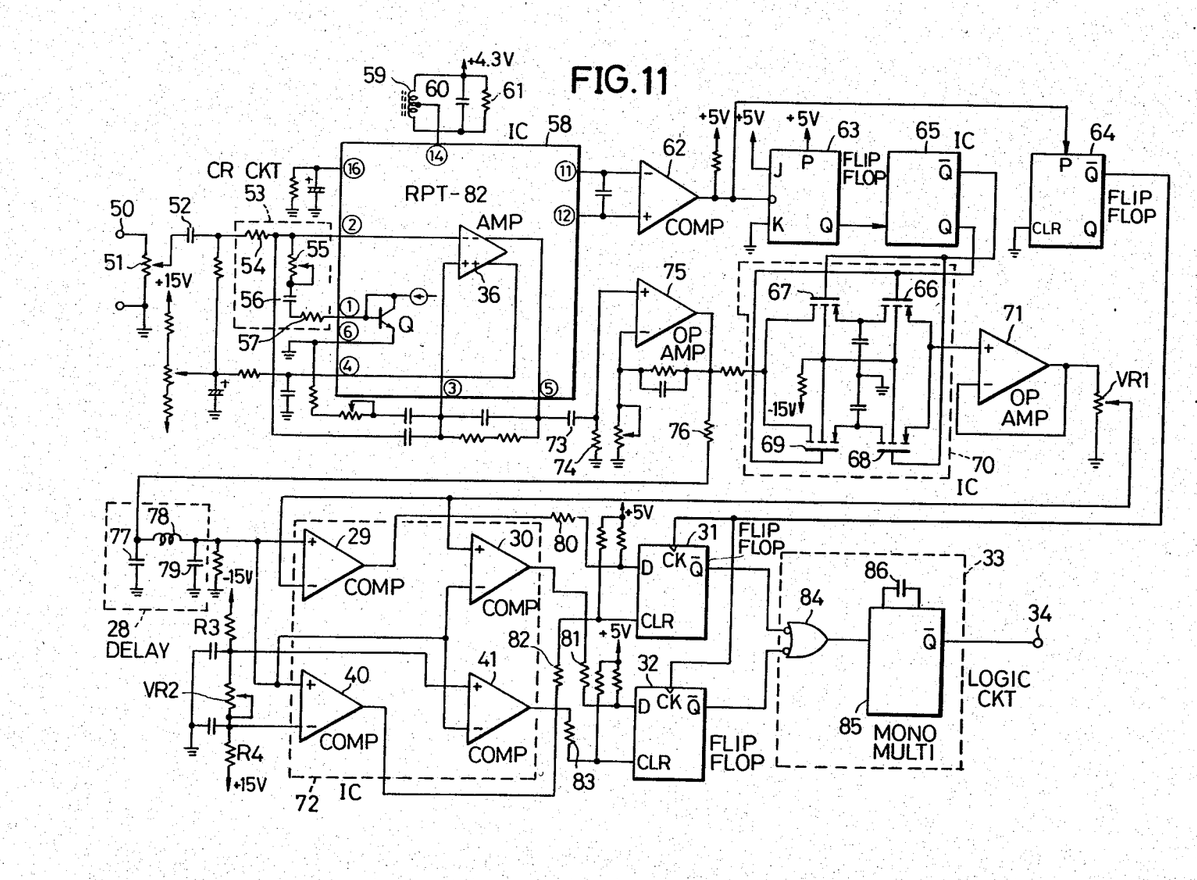
FIG. 11 is a circuit diagram showing a concrete circuit of an embodiment of the digital signal reproducing apparatus according to the present invention.

FIG. 11 shows a concrete circuit diagram of the second embodiment of the digital signal reproducing apparatus according to the present invention shown in FIG. 8. In FIG. 11, those parts which are the same as those corresponding parts in FIG. 8 are designated by the same reference numerals, ard their description will be omitted. The reproduced bipolar signal from the equalizer (not shown), is applied to an input terminal 50 and is then supplied to a pin ② of an integrated circuit (IC) 58 through a variable resistor 51, a capacitor 52, and a CR circuit 53. The CR circuit 53 comprises resistors 54 and 57, a capacitor 56, and a variable resistor 55. The variable resistor 55, the capacitor 56, and the resistor 57 are coupled in series between the pin ② and a pin ① of the IC 58. A chip RPT-82 manufactured by Precision Monolithics Incorporated of the United States, may be used for the IC 58. The chip RPT-82 is a monolithic integrated circuit which is used in a regenerative repeater for a telephone transmission line, in the so-called T-1 PCM transmission system which has been employed in the United States since 1961. Because the transmission rate of the T-1 system is 1.544 Mbps and the chip RPT-82 operates at this transmission rate, a slight circuit modification must be made before the chip RPT-82 can be employed for the magnetic recording and reproduction.

The IC 58 constitutes an automatic gain control and clock generator circuit 42 shown in FIG. 8. The automatic gain control and clock generator 42 comprises the amplifier 36, the peak value detection circuit 37, the pulse/voltage converting circuit 38, the timing component extracting circuit 24, and the clock generator 25. An NPN type transistor Q in the IC 58, which has its base and collector coupled to the pin ① of the IC 58, is a variable resistor element which corresponds to the variable resistor $R_2$ shown in FIG. 8 and the diode D shown in FIG. 9. The CR circuit 53 constitutes an external circuit part which comprises the resistor $R_1$ and the capacitor $C_o$ shown in FIG. 8. In addition, because the capacitor $C_3$ of the clock generator 25 has a small capacitance in the order of 12 pF, the capacitor $C_3$ is built within the IC 58. A parallel circuit comprising a coil 59, a capacitor 60, and a resistor 61, which is coupled between a pin ⑭ of the IC 58 and a power source terminal of 4.3 volts, constitutes the resonant circuit within the timing component extracting circuit 24.

Signals obtained through pins ⑪ and ⑫ of the IC 58, are respectively supplied to a comparator 62 wherein the signals are converted into a pulse waveform. The output pulse of the comparator 62, is supplied to J-K type flip-flops 63 and 64, as a signal which corresponds to the Q-output signal of the clock generator 25 described before. A chip SN74LS109 manufactured by Texas Instruments, Inc. of the United States may be used for the flip-flops 63 and 64. A Q-output signal of the flip-flop 63 is supplied to a driver IC 65 which may be a chip D169 manufactured by Siliconix, Inc. of the United States, for example. The Q-output signal of the flip-flop 63 which is supplied to the IC 65, is amplified to a voltage which is required to drive an IC 70 which comprises four field-effect transistors (FETs) 66 through 69, and is frequency-divided by $\frac{1}{2}$. Thus, the IC 65 corresponds to the $\frac{1}{2}$-frequency divider 26 shown in FIG. 8.

The FETs 66 through 69 of the IC 70 correspond to the switches $SW_1$ through $SW_4$ shown in FIG. 8. For example, a chip SD5000 manufactured by Signetics Corp. of the United States, for example, may be used for the IC 70. The FETs 66 and 69 are controlled of their switching states by the Q-output signal of the IC 65, and the FETs 67 and 68 are controlled of their switching states by a $\overline{Q}$-output signal of the IC 65. An output signal of the IC 70 is supplied to the variable resistor $VR_1$, through an operational amplifier 71 which constitutes a voltage-follower corresponding to the buffer amplifier 27. The signal which is subjected to the voltage division in the variable resistor $VR_1$, is supplied to the operational amplifiers (comparators) 29 and 30 within an IC 72.

A chip HA4905 manufactured by Harris Semiconductor Products Division of the United States, for example, which comprises the comparators 29, 30, 40, and 41, may be used for the IC 72. On the other hand, the output signal of the amplifier 36, which is obtained through a pin ⑤ of the IC 58, is supplied to an operational amplifier 75 through a filter circuit which comprises a capacitor 73 and a resistor 74. An amplifier output of the operational amplifier 75 is supplied to the IC 70 to control the switching, and the amplified output is supplied to a non-inverting input terminal of the operational amplifier 71 and to the delay circuit 28 through a resistor 76. The delay circuit 28 is constituted from capacitors 77 and 79, and a coil 78. The delayed output of the delay circuit 28 is supplied to the IC 72.

The output signals of the comparators 29 and 30 within the IC 72, are respectively supplied to terminals D of the flip-flops 31 and 32, through resistors 80 and 81. In addition, the output signals of the comparators 40 and 41 are respectively supplied to the clear terminals CLR of the flip-flops 31 and 32, through resistors 82 and 83. On the other hand, because the clear terminal CLR of the flip-flop 64 is grounded, a signal obtained by inverting the phase of the output signal of the operational amplifier 62 which is applied to a preset input terminal P of the flip-flop 64, is produced through a $\overline{Q}$-output terminal of the flip-flop 64. This $\overline{Q}$-output signal of the flip-flop 64 is supplied to the clock terminals of the flip-flops 31 and 32. Accordingly, the flip-flop 64 corresponds to an inverter, and the $\overline{Q}$-output signal of the flip-flop 64 corresponds to the $\overline{Q}$-output signal of the clock generator 21 described before.

The $\overline{Q}$-output signals of the flip-flops 31 and 32 are supplied to a 2-input OR circuit 84, and an output signal of this OR circuit 84 is supplied to a monostable multivibrator 85 to trigger the monostable multivibrator 85. The logic circuit 33 is constituted by the OR circuit 84 and the monostable multivibrator 85, and the monostable multivibrator 85 has a capacitor 86 which has a capacitance in the order of 1500 pF for determining the time constant. The digital signal h described before, is obtained from the logic circuit 33.

Figure 10:
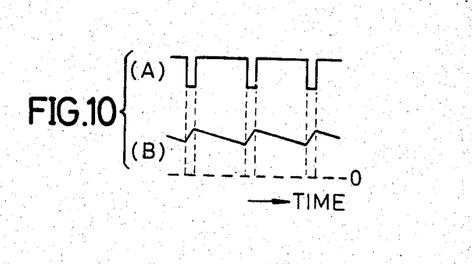
FIGS. 10(A) and 10(B) are graphs respectively showing signal waveforms for explaining the operation of the circuit shown in FIG. 9.

The present invention is not limited to the embodiments described heretofore, and for example, the switches $SW_1$ through $SW_4$ may of course be electronic switches which turn ON when the logic level of the control signals d and $\overline{d}$ is "0" and turn OFF when the logic level of the control signals d and $\overline{d}$ is "1". In this case, the logic outputs Q and $\overline{Q}$ of the $\frac{1}{2}$-frequency divider 26 should be coupled to the input terminals of the electronic switches in a reverse relationship to the connections employed in the embodiments described heretofore. Cenerally, FETs are employed to constitute the electronic switches as shown in FIG. 10, when the electronic switches are to operate with both the positive and negative polarity signals. However, diodes and bipolar transistors may be employed to constitute the electronic switches. When making the electronic switches in the form of an integrated circuit, it would be advantageous to employ transistors, diodes, and the like, but such an arrangement requires biasing as is well known. However, when realizing the switches $SW_1$ through $SW_4$ by use of transistors and diodes, the complementary output control signals d and $\overline{d}$ of the $\frac{1}{2}$-frequency divider 26 may be used to form a D.C. biasing current, in addition to controlling the switches $SW_1$ through $SW_4$.

The automatic amplitude control circuit 35 may be designed to maintain the positive or negative peak value or the average value of the input bipolar signal a or b, to a constant value. Further, when the reproducing amplifier 18 is constituted by a limiting amplifier, the output signal is reproduced as a unipolar signal and not a bipolar signal. In this case, if the unipolar signal is a digital signal such as the NRZ (non return to zero) including no timing component, a differentiating circuit and a full-wave rectifying circuit should be coupled in series in an input stage or an output stage of the equalizer 19 and the frequency should be doubled so as to form a timing component, before applying such a unipolar signal to the input terminal 22 in order to apply the present invention.

Moreover, the $\frac{1}{2}$-frequency divider 26 may be a circuit such as a reset-and-set (R-S) type flip-flop, a delay type (D-type) flip-flop, and the like, which are capable carrying out the frequency division by $\frac{1}{2}$. In addition, the variable resistors $VR_1$ and $VR_2$ may be replaced by fixed resistors.

In the embodiments described heretofore, the reproduced signal is a bipolar signal because the present invention was applied to the partial response system which employs the levels (1, 0, −1). However, the present invention may also be applied to partial response systems which employ the levels (1, −1, 1) or (1, 2, 1), for example, in which case the reproduced signal will be a unipolar signal.

In addition, the recording medium from which the recorded signal is reproduced, is not limited to the magnetic recording mediums such as the magnetic tape and the disc-shaped magnetic sheet, and may be an optical type recording medium from which the recorded signal is optically reproduced.

Further, the present invention is not limited to these embodiments, but various variations and modifications may be made without departing from the scope of the present invention.

What is claimed is:

1. A digital signal reproducing apparatus for reproducing a recorded unipolar signal from a recording medium and for detecting the signal level of the reproduced unipolar signal so as to reproduce a desired unipolar digital signal, said recorded unipolar signal being obtained by passing said desired unipolar digital signal through a converter and delay means, feeding back a delayed output signal of said delay means to said converter, and carrying out a modulo-2 addition in said converter, said digital signal reproducing apparatus comprising:

reproducing means for reproducing said recorded unipolar signal from said recording medium;

an equalizer for subjecting the reproduced signal from said reproducing means to a waveform equalization;

a timing component extracting circuit for extracting a timing component which has a period equal to one bit transmission period of said recorded unipolar signal, from an output signal of said equalizer;

a clock signal generating circuit supplied with said timing component from said timing component extracting circuit, for generating one or a plurality of clock signals which are in phase synchronism with said timing component;

a control signal generating circuit supplied with said timing component, for generating one or a plurality of control signals;

a sample and hold circuit supplied with the output signal of said equalizer and said one or a plurality of control signals, for sampling and holding a peak value of the output signal of said equalizer for every one bit transmission period according to said one or a plurality of control signals;

a variable resistor for voltage-dividing an output signal of said sample and hold circuit, and for producing a reference signal;

a delay circuit for delaying the output signal of said equalizer so as to match the timing of the output signal of said equalizer with the timing of said reference signal;

a comparing circuit for comparing the level of an output signal of said delay circuit with the level of said reference signal, and for producing a unipolar pulse signal; and a reproduced digital signal producing circuit for controlling the pulse width and the pulse position of the output unipolar pulse signal of said comparing circuit by said one or a plurality of clock signals, and for producing a reproduced unipolar digital signal.

2. A digital signal reproducing apparatus as claimed in claim 1 which further comprises an automatic amplitude control circuit for maintaining the peak value or an average value of the output signal of said equalizer, and for supplying an output signal to said timing component extracting circuit, said sample and hold circuit, and said delay circuit as the output signal of said equalizer.

3. A digital signal reproducing apparatus as claimed in claim 2 in which said reproduced digital signal producing circuit comprises a first pulse signal obtaining circuit for comparing the level of the output signal of said automatic amplitude control circuit obtained through said delay circuit and the level of said reference signal and for obtaining a first pulse signal, a threshold value generating circuit for generating threshold values which define a region in which the amplitude of the output signal of said delay circuit is assumed to be zero in A.C., a second pulse signal obtaining circuit for comparing the level of one of said threshold values from said threshold value generating circuit and the level of the output signal of said delay circuit and comparing the level of the other of said threshold values from said threshold value generating circuit and the level of the output signal of said delay circuit and for obtaining a second pulse signal, and circuit means for controlling the pulse width and the pulse position of said first pulse signal by said one or a plurality of clock signals and said second pulse signal and for producing the reproduced unipolar digital signal.

4. A digital signal reproducing apparatus as claimed in claim 2 in which said automatic amplitude control circuit comprises an A.C. attenuator circuit including a variable resistor element which is varied of its resistance by an external control signal, a resistor, and a D.C. blocking capacitor, an amplifier for amplifying an output signal of said attenuator circuit, a detecting circuit for detecting an average value or a peak value of an output signal of said amplifier, and an external control signal producing circuit for producing the external control signal which varies the resistance of said variable resistor element according to an output signal of said detecting circuit so that an average value or a peak value of the output signal of said attenuator circuit assumes a constant value.

5. A digital signal reproducing apparatus as claimed in claim 3 in which said circuit means comprises first and second delay type flip-flops supplied with said second pulse signal to clear terminals thereof, said first pulse signal to data input terminals thereof, and said one or a plurality of clock signals from said clock signal generating circuit to clock input terminals thereof, and a logic circuit for at least obtaining a logical-OR of output signals of said first and second flip-flops.

6. A digital signal reproducing apparatus as claimed in claim 4 in which said external control signal producing circuit comprises a first transistor supplied with the output signal of said detecting circuit to a base thereof, said first transistor being turned ON when the average value or the peak value of said attenuator circuit is detected, a second transistor having a collector thereof coupled to a power source terminal and to an emitter of said first transistor, said second transistor having a base thereof coupled to a collector of said first transistor, and a parallel circuit coupled between ground and a connection point between the collector of said first transistor and the base of said second transistor, said parallel circuit comprising a capacitor and a resistor, said external control signal being produced through an emitter of said second transistor.

* * * * *